June 28, 1927.
J. W. CASEY
1,633,923
AUTOMATIC WEIGHT OPENING VALVE
Filed July 30, 1926
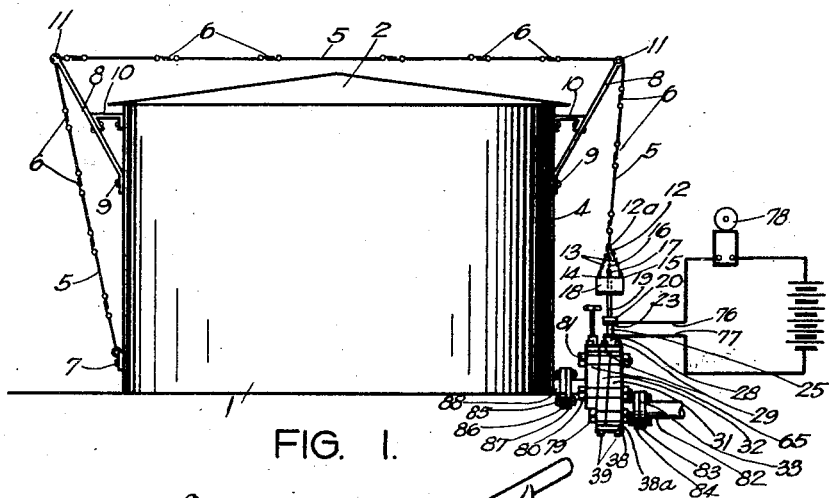
FIG. 1.
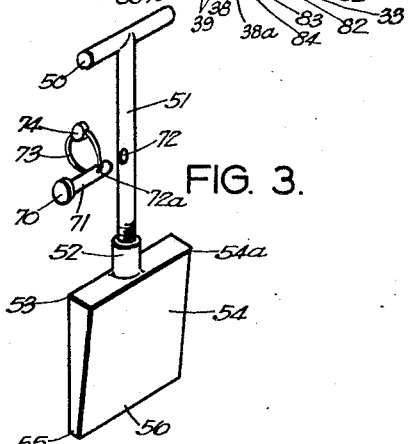
FIG. 3.
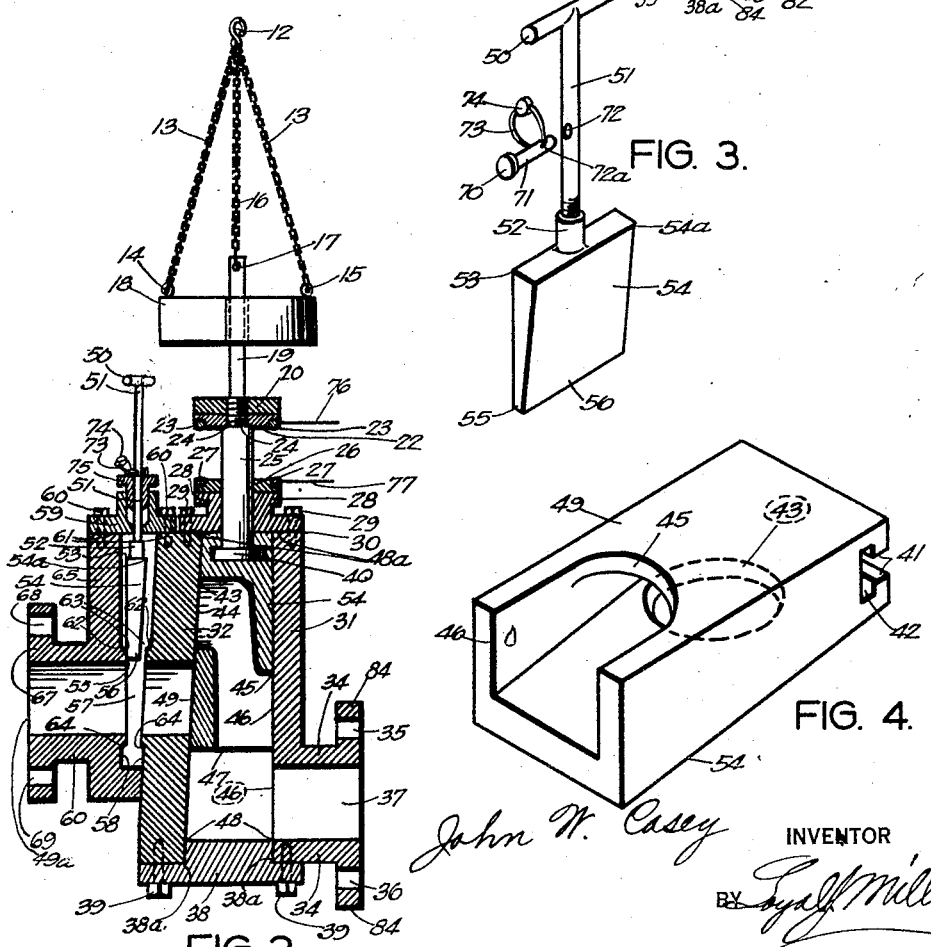
FIG. 2.
FIG. 4.
John W. Casey
INVENTOR
BY
ATTORNEY Patented June 28, 1927.

1,633,923

UNITED STATES PATENT OFFICE.

JOHN W. CASEY, OF OKLAHOMA CITY, OKLAHOMA, ASSIGNOR TO MINNIE E. CASEY, OF OKLAHOMA CITY, OKLAHOMA.

AUTOMATIC WEIGHT OPENING VALVE.

Application filed July 30, 1926. Serial No. 125,960.

My invention pertains to improvements in an automatic weight opening valve.

The object of the invention is to provide a device of the character described, which will be new, novel, of practical utility, substantial and cheap, and which will automatically open the valve under certain contingencies, give an alarm signal of the opening of same and be particularly adaptable to provide for draining of tanks of oil, gases, paints, inflammable substances and the like, when in danger from fire, and the like, and greatly reduce the loss of materials, prevent the spreading of fire to other tanks, and reduce the rate and cost of insurance from such former dangers.

Other objects, novel features, details in construction and the invention will be apparent in specification and claims, and illustrated in the accompanying one sheet drawing, of which, Figure 1 is an elevation view of a tank with the valve installed, and also showing the alarm circuit; Fig. 2 is an enlarged section of the valve; Fig. 3 is a perspective view of the inspector's gate; Fig. 4 is a perspective view of the main valve block or gate.

Like characters denote like parts throughout the several views.

I obtain the object of my invention by the mechanism described as follows:

A tank 1 for paints, oils, gasoline, crude oil, or the like is shown in Figure 1, having a top 2, sides 3 and 4, a metallic wire 5 is provided with a plurality of fusible links 6, placed periodically on said wire; said wire is anchored at one end 7 to the tank 1; near its top, the tank or receptacle is provided with an arm 8 standing outwardly and upwardly with relation to the tank and anchored to the tank 9. It is braced by a bracket 10 to keep said arms extended from and away from the sides of the tank, and from its top. These arms are extended far enough to prevent the wire 5 from coming into contact with any part of the tank. Each of said arms has on each outer end a pulley 11 over which passes wire 5; the second end 12ª of said wire 5 unites with an eye 12 connecting with a plurality of supporting chains 13 connecting with eyes 14, 15 supporting a weight 18; another chain 16 is centrally depended from said wire 5 at said eye 12 and supports at perforation 17 the smaller and upper end 19 of weight stem 25. This has a metallic flange 20 cast therearound. A centrally threaded portion 21 therearound receives a similarly threaded fiber gasket 22. Below said fiber gasket 22 are shoulders 24 on which, and between it and flange 20, said gasket 22 is seated. In the lower outer edge of said fiber gasket 22 is a copper ring 23, adapted to fit and contact a similar copper ring 27 in the upper and outer edge of fiber gasket 26. Below said fiber gasket 26 is a metallic flange 28, surrounding said weight stem 25, securely fastened by bolts 29 through perforations 30 to the outer housing 31 of said valve, and the upper end of the inside surface 32 of said valve. The outer housing 31 has in its lower portion an outlet 37, and an outstanding flange shown at 33, 34, 35 and 36; a second flange 38 having shoulders 38ª, is fastened by bolts 39 to the lower ends of outer housing 31 and inside surface 32. The weight stem 25 has on its lower end a partial head 40 adapted to fit into openings 41 and 42 in the main block of the valve. This main block has an inlet 43 and an outlet 46, and said main block is adapted to be raised and lowered with the weight stem in the opening between the outer housing 31 and side 32 of the inner housing, the lower ends 48 of the way of said block is wider than the upper ends 48ª, the outer edge 44 of the said inner housing 32 is beveled outwardly and downwardly from 48ª to 48. The inside surface of outer edge 31 and the outer edge 45 of said main block are straight and the inside edge 49 of said main block and the outer edge 44 of said inside housing 32 are similarly beveled, so that when the said main block is thrust uppermost in said way the said main block fits snugly the upper part thereof and entirely shuts off the flow of the liquid from the inlet 49ª. The inner surface of outer housing 31, surface 44 of inner housing 32, and the surfaces 49 and 54 of said main block are smooth so as to make a tight seal between the valve body walls and the face of the main body weight.

Copper rings 23 and 27 are connected by wires 76 and 77 to electric circuit and when contact of the two rings is made causes the ringing of a bell 78 placed at some suitable location for alarm.

There is also provided a third housing member 65 having an outer flange, parts of which are shown at 66 and 67 with perforations 68 69 through a portion of it. This is held in place with relation to middle housing 32 by bolts 60 through flange member 59 thereabove. In an opening in the top of said flange is provided a stuffing-box 75 to take care of the action of the gate-stem 57 so as to prevent escape of liquid therearound. A cross-bar 50 on the end of wedge stem 51 threaded into shoulder 52 on wedge block 53, 54, 55 and 56, is normally held in an inactive position by being thrust uppermost in its throw between said members of the housing 32 and 65. A stuffing-box 75 is provided for the upper portion of said block stem 51. A pin with head 70 and body 71 normally resides in hole 72 through said stem 51; a ring 73 then passes through hole 72$^a$ in said pin and is then locked with an inspector's seal 74. When the valve needs cleaning, or fixing, or is otherwise out of commission this stem and block is lowered through inlet 49$^a$ slipping into groove 57; the lower straight edged corner 55 and its lower side edged corner 56 are seated slightly above the wider openings therebelow 58, and form the beveled plane surface side thereof 54; the upper straight edged corner 53 and the upper beveled edged corner 54$^a$ then fit snugly in the aperture or opening above inlet 49$^a$, thereby tightly closing the inlet and stopping the flow of fluid therefrom. The upper corners 61 of the way of said wedge are wider than its lower corners 62. The space in the way surrounding the wedge when in inoperative position provides for any small amount of liquid which may be required to be taken care of when said wedge or gate is quickly lowered to contact edges 63 in the upper portion of groove 57. The space surrounding the lower edge 56 of said gate and between that and corners 58 and 64 are also for the purpose of taking care of any small amount of liquid required to be taken care of when said edge 56 quickly is thrust therein. Said separate housing members 31, 32 and 65 together with the contents therein are securely held together by bolt 79 and two longer bolts 80, 81 passing through perforations in the rear of said housings, (not shown). Standard companion flanges 83, 84 are held together by bolts 33 to connect to discharge line 82 for the purpose of carrying away the inflammable fluid from valve outlet 37. On the other side of the valve are other similar standard companion flanges 85, 86 held together by bolts 87 connecting the inlet 49$^a$ of the valve to the outlet 88 of the tank. The weight of the main block and its appurtenances is ordinarily sufficient to cause its descending into the lower part of its way when released by the melting of a fusible link without weight 18 dropping on metallic bumper plate 20. But this provision of said weight and bumper plate is made so that if the parts of the valve surrounding its sliding parts become rusted, corroded or too tight for the weight of the main body and its parts to cause it to descend, the addition of the jar of said falling weight 18 will cause them to at once descend and the valve at once to open, and the rings 23 and 27 to contact and cause the bell or alarm 78 to be sounded. Whenever the valve opens the circuit closes and whenever the valve closes the circuit opens.

In active operation of the valve it will be seen that when the valve is closed as is shown in Figs. 1 and 2 the contents of the tank 1 will be kept intact. When, however, a fire is in proximity to the tank and of sufficient violence to melt the fusible links, or any one of them, wire 5 which is partially made up of connections with said link 6, will be divided and the weight 18 on the end of said wire will at once descend on the smaller portion 19 of the valve stem 25 abutting on bumper plate 20. This forces copper ring 23 to contact copper ring 27 completing a circuit (not numbered) and immediately sound the alarm 78. It also causes valve stem 25 to descend through flange 28 and the main block to descend in the way provided therefor so that the bottom thereof 47 will contact corners 48, and place port 43 in line with outlet 49, and outlet 46 in line with opening 37 connected by standard companion flanges 84 and 83 to discharge line 82.

The block gate normally is in raised position as shown in Fig. 2, but when desired to be operated, inspector's seal 74 is broken and ring 73 removed from perforation therein 72$^a$ and pin 71 is removed from hole 72 in gate stem 51. By pushing on handle 50 said gate is lowered from its normal position to its seat 57 across port 49$^a$ entirely closing said port, and shutting off egress of fluid from the port 49$^a$ and tank 1. When the valve is in condition to be used again said gate is then raised in its former normal inactive position, and the stem 19 thereof locked with an inspector's seal, until further needed in active operation.

An outer housing over the entire valve and weight is desired to be installed but this is not claimed as a part of this invention.

From the description and the accompanying one sheet drawing, and the specification, the advantages of construction and manufacture and the application of the invention will be apparent to those skilled in the art to which my invention pertains. I have entered into a detailed description of the construction and relative arrangement of the parts embraced in the present and preferred embodiment of my invention in order to impart a full, clear and exact understanding of the said embodiment. I do not desire, however to be understood as confining myself to the specific construction and relative arrangement of the parts inasmuch as in the future practice of the invention various changes and modifications may be made such as fall within the scope of my invention as defined in my appended claims, without departing from the principle of the invention.

Having thus described the invention, what is claimed and desired to be secured by Letters Patent, is:

1. A device of the character described, comprising a wedge shaped valve block slidable in a similar shaped way in a housing therearound, and having entrance ports and exit ports adapted to connect similar ports in said valve, said last named ports adapted to be connected by a suitable means to a tank and to a discharge line; a valve stem having a weight therearound, both being adapted to connect with a wire having a plurality of fusible links therein, and surrounding a tank; means for keeping said wire and said links from the sides and top of said tank, an insulating gasket and a copper ring on said valve stem, a second copper ring therebelow, and a second insulating gasket, the second ring being adapted to contact said first ring and to close an electric circuit thereby to sound an alarm; a gate in a second housing of said valve, adapted to shut off the liquid in the tank from the valve and discharge line; means normally holding said gate in inoperative position, and means for sealing said last mentioned means.

2. A device of the character described, comprising a substantially box shaped housing, connecting a tank outlet with companion flanges on one side, and a discharge line with companion flanges on the other side; a weight slidable on a valve stem and adapted to be connected with a wire and a plurality of fusible links surrounding the sides and top of a tank; anchoring means and brackets holding said wire and links from contacting the tank; a weight receiving flange on said valve stem, an insulating gasket therebelow, and a copper ring therearound and therebelow; a second copper ring therebelow and around and above a second insulating gasket, adapted to contact said first copper ring and to close an electric circuit for alarm purposes; a valve block operative with said valve stem; an upper inlet port and a lower outlet port in said block; smooth, wedge shaped side surfaces thereon adapted to slidably fit similar surfaces inside said valve housing, said valve block adapted to close and to open ports in said housing which connect with a tank thereabove and with a discharge line therebelow; a gate, gate-stem, and gate-way adapted to shut off the liquid in the tank from the valve and discharge line; means normally holding said gate in an inoperative position, and means for sealing said last mentioned means.

JOHN W. CASEY.